United States Patent
Lagarde et al.

(10) Patent No.: US 9,665,084 B2
(45) Date of Patent: May 30, 2017

(54) DETECTION OF THE POSITION OF A WINDING DRUM COUPLED TO A MOTOR VIA A DAMPING FLEXIBLE ELEMENT

(71) Applicant: Somfy SAS, Cluses (FR)

(72) Inventors: Eric Lagarde, Sallanches (FR); Ronan Georgeault, Cluses (FR); Laurent Montéremand, La Roche sur Foron (FR); Serge Blanc, Saint Sixt (FR); Joël Ramos, Nangy (FR)

(73) Assignee: SOMFY SAS, Cluses (FR)

( * ) Notice: Subject to any disclaimer, the term of this patent is extended or adjusted under 35 U.S.C. 154(b) by 0 days.

(21) Appl. No.: 14/896,302

(22) PCT Filed: Jun. 6, 2014

(86) PCT No.: PCT/EP2014/061775
§ 371 (c)(1),
(2) Date: Dec. 4, 2015

(87) PCT Pub. No.: WO2014/195439
PCT Pub. Date: Dec. 11, 2014

(65) Prior Publication Data
US 2016/0124418 A1 May 5, 2016

(30) Foreign Application Priority Data
Jun. 6, 2013 (FR) ...................................... 1355237

(51) Int. Cl.
*G05B 11/01* (2006.01)
*G05B 19/404* (2006.01)
(Continued)

(52) U.S. Cl.
CPC .............. *G05B 19/404* (2013.01); *E06B 9/68* (2013.01); *E06B 9/72* (2013.01);
(Continued)

(58) Field of Classification Search
CPC ............... E06B 9/68; E06B 2009/6845; E06B 2009/6809; G05B 2219/2653
See application file for complete search history.

(56) References Cited

U.S. PATENT DOCUMENTS

| 2005/0206334 | A1 | 9/2005 | Cavarec et al. |
| 2014/0338844 | A1* | 11/2014 | Diederiks ................ E06B 9/68 160/5 |

FOREIGN PATENT DOCUMENTS

| DE | 10239788 B | 2/2004 |
| WO | WO 2005/090736 A | 9/2005 |

OTHER PUBLICATIONS

Search Report for PCT/EP2014/061775 issued by European Patent Office on Dec. 10, 2014, published as WO 2014/195439 A3, with publication date of Dec. 11, 2014.

* cited by examiner

*Primary Examiner* — Karen Masih
(74) *Attorney, Agent, or Firm* — Haug Partners LLP

(57) ABSTRACT

An apparatus (10) for winding a screen (12) comprises a winding drum (14) for winding the screen (12) which can rotate about an axis of rotation (16) with respect to a fixed frame of reference over more than one revolution between at least one first end-of-travel position and a second end-of-travel position, a motor assembly (30) comprising a motor (32) equipped with a stator (32.1) intended to be fixed to a fixed support (23, 26) and a rotor (32.2) kinematically connected to the winding drum (14). A first measurement assembly (51) comprises a first encoder (46) secured to the rotor (32.2), a first sensor for reading the first encoder (46) and generating a first counting signal when the first encoder (46) turns. First processing means (50) generate, as a function of the first counting signal, a first signal indicative of the position of the screen, which signal is monotonous when the (Continued)

drum moves from the first end-of-travel position to the second end-of-travel position. A second measurement assembly (64) makes it possible to detect at least one indexed position of the drum (14) per revolution of the drum in the fixed frame of reference. A calibration memory (56) stores at least one first calibration value for the first signal indicative of the position of the screen in the indexed position of the drum and at least one first quantitative algebraic comparison between a current value of the first signal indicative of the position of the screen as measured on passing through the indexed position during an observation phase and the first calibration value is delivered.

17 Claims, 2 Drawing Sheets

(51) Int. Cl.
*E06B 9/72* (2006.01)
*E06B 9/68* (2006.01)
(52) U.S. Cl.
CPC ................ *E06B 2009/6809* (2013.01); *E06B 2009/6845* (2013.01); *E06B 2009/6872* (2013.01)

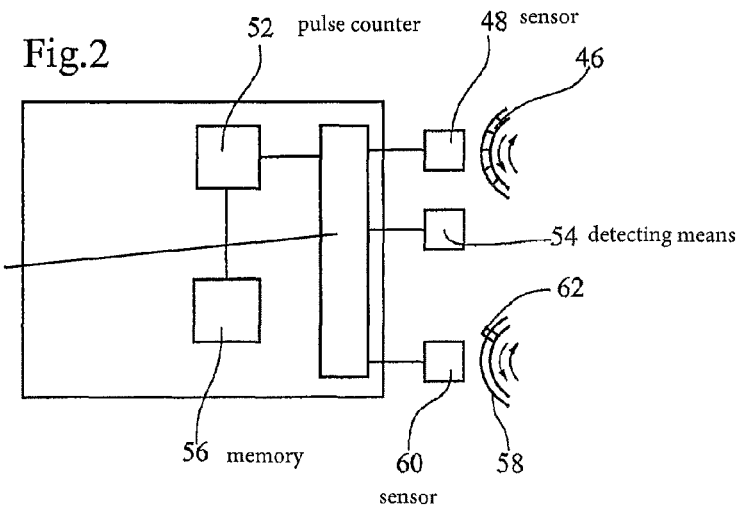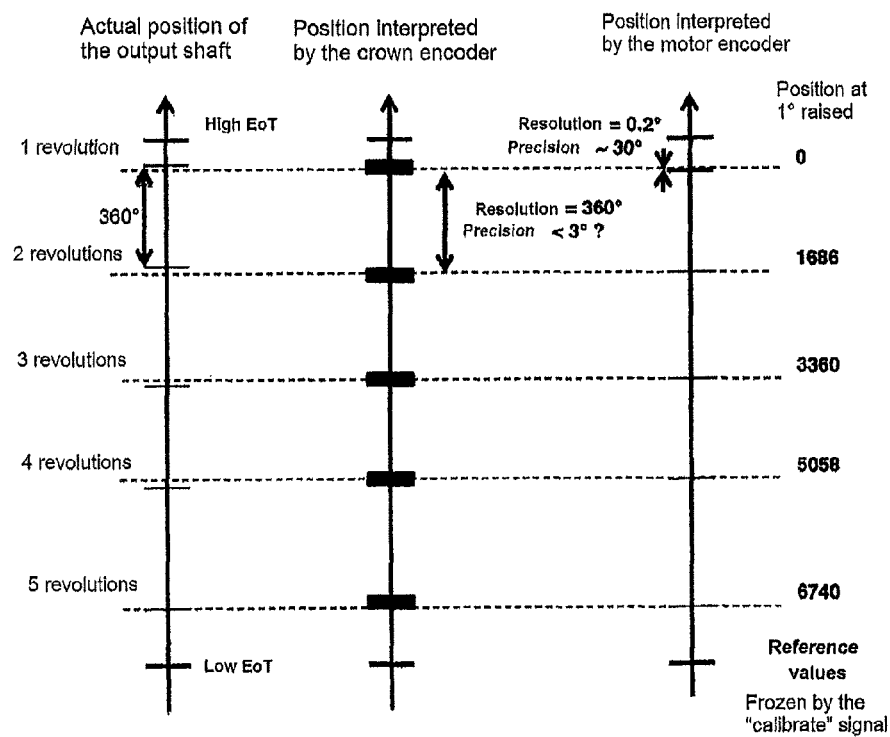

DETECTION OF THE POSITION OF A WINDING DRUM COUPLED TO A MOTOR VIA A DAMPING FLEXIBLE ELEMENT

CROSS-REFERENCE TO RELATED APPLICATIONS

This application is the National Stage entry under 35 U.S.C. §371 of International Application No. PCT/EP2014/061775 filed Jun. 6, 2014, published on Dec. 11, 2014 under publication number WO 2014/195439 A1, which claims the benefit of priority under 35 U.S.C. §119 of French Patent Application Number 1355237 filed Jun. 6, 2013.

TECHNICAL FIELD OF THE INVENTION

The invention relates to a motorized device for winding a screen, and in particular a home automation screen for partially or completely concealing an opening in a building, a partition or projection screen, a sun protection screen that unwinds vertically or obliquely, or an anti-intrusion grate or rolling shutter.

BACKGROUND OF THE INVENTION

In document WO 2005/090736, a motorized winding device is described equipped with damping flexible elements allowing a certain vibrational uncoupling between the motor assembly and its environment, so as to minimize the vibrations and noise perceived by the user. It is thus proposed to insert a rotary damping flexible element between the output shaft of the motor assembly and a winding drum of the screen. It is also proposed to insert a stationary damping flexible element between the casing of the motor assembly and a stationary support.

Under some circumstances, the insertion of a damping flexible element, whether rotary or stationary, may create uncertainty regarding the angular positioning of the drum driven by the motor, for example due to creep of the damping flexible element, or a variation in the static load torque.

Independently of the potential presence of damping flexible elements, similar phenomena may be encountered due to the aging of certain components of the actuator, for example in a reduction stage inserted between the motor and the drum. Other drifts may be related to differential thermal expansions of the components of the actuator.

When a rotation sensor connected to the motor is used, in particular a rotation sensor of the rotor, or rotary part, of the motor, to detect certain remarkable positions of the screen, and in particular end-of-travel positions, the aforementioned uncertainty may create imprecision in the control of the apparatus, for example resulting in incorrect positioning of the screen at the end of travel. Precise positioning is indeed required in particular for sun protection screens on a façade, since they must keep load bars perfectly aligned in extreme or intermediate positions.

A specific sensor may naturally be used, for example positioned between the drum of the screen and the stationary support, to precisely measure the angular position of the drum in a fixed frame of reference. However, the cost of such an additional instrumentation of the device is high if one wishes to obtain a satisfactory precision level of approximately +/−3 to 5°. Indeed, the rotation speed of the drum being considerably lower than the output speed of the motor, it is necessary to provide a much higher angular positioning precision.

There is therefore a need to improve the control of a motorized winding device of the aforementioned type, so as to decrease positioning errors, using simple, robust and inexpensive means.

BRIEF DESCRIPTION OF THE INVENTION

The invention aims to resolve the drawbacks of the state of the art. To that end, a first aspect of the invention proposes a winding device for a screen, including
- a winding drum for winding the screen, which can rotate around an axis of rotation with respect to a stationary frame of reference over more than one revolution between at least one first end-of-travel position and a second end-of-travel position;
- a motor assembly comprising a motor equipped with a stator intended to be fixed to a stationary support and a rotor kinematically connected to the winding drum; and
- a first measurement assembly comprising a first encoder secured to the rotor, a first sensor for reading the first encoder and generating a first counting signal when the first encoder turns; and first processing means generating, as a function of the first counting signal, a first signal indicative of the position of the screen, the first signal being monotonic when the drum moves from the first end-of-travel position to the second end-of-travel position;
- a second measurement assembly making for detecting at least one indexed position of the drum per revolution of the drum in the fixed frame of reference,
- a calibration memory for storing at least one first calibration value for the first signal indicative of the position of the screen in the indexed position of the drum; and
- a comparator for delivering at least one first quantitative algebraic comparison between a current value of the first signal indicative of the position of the screen as measured on passing through the indexed position during an observation phase and the first calibration value.

The comparator provides an indication of any shift between the rotor and drum via means that do not require significant computing and measurement resources.

A first, relatively precise measurement assembly for detecting the rotation of the motor is thus combined with a second measuring assembly that may be particularly simple, since its function is simply to generate one or more references per revolution of the drum.

Any measurement principle may be used for the first measurement assembly, and may for example implement an encoder rotating with the rotor, for example a magnetic encoder positioned at an air gap distance of a magnetic sensor, and in particular a Hall effect sensor or a reed switch, or an optic encoder positioned across from a light source and a photosensitive cell, or a phonic wheel positioned across from a capacitive sensor. The encoder can also be made up of the poles of the rotor of the motor. Preferably, the sensor is a set of two detectors of the same type, such that the first measuring assembly is capable of also discriminating the rotation direction of the rotor. The image signal of the rotation of the rotor is a monotonic signal, i.e., a signal represented by an increasing or decreasing function over the entire interval in question between the end-of-travel positions. In practice, in the scenario where the signal delivered by the first sensor is analog, the first processing means can comprise preconditioning of the analog signal to form a binary signal made up of a series of pulses. These pulses are sent toward a pulse counter, to perform algebraic counting of the observed pulses, which are given a sign based on the rotation direction of the rotor, the latter being detected by the first sensor or by an independent detector. There may be any number of poles or state changes per rotor revolution, and this number may for example be greater than 8 or 16, to obtain a sufficient spatial resolution.

The measuring principle used for the second measuring assembly may or may not be identical to that of the first measuring assembly, and for example implement one or another of the magnetic, optical or capacitive devices mentioned above. It is also possible to consider a cam actuating a contact upon its revolution. In both cases, a contactless measuring assembly will be preferred, in particular to avoid interacting mechanically with the rotating parts and, in the case of the second measuring assembly, to allow reading of the information through the wall of a tube forming the housing of the actuator.

According to one embodiment, the second measuring assembly includes a second encoder secured to the drum, a second stationary sensor in the stationary frame of reference to read the second encoder, and second processing means to generate a second signal representative of a passage by the indexed position when the second encoder rotates with the drum. The second signal is used to detect the indexed position. The second processing means may for example comprise a counter that counts pulses generated by the sensor upon passage of the encoder. In one particularly simple version, it is possible to do away with the counting, if one considers that the potential variation in angular position of the output shaft for a given angular position of the roller is less than half of the angular resolution of the second sensor. Indeed, in this case, each passage by the indexing position corresponds to a single value range of the first signal indicative of the position of the screen.

According to one embodiment, the second encoder has no more than eight singularities, and preferably one singularity, readable by the second sensor upon each drum revolution. One single singularity is sufficient for one indexing per revolution. The encoder can be particularly simple. If one chooses to index the position several times per revolution, each indexing position, or at least one of them, is preferably identified uniquely. The second measuring assembly thus works without contact through the wall of the tube of the actuator.

According to one embodiment, the drum is guided relative to the stationary support by means of at least one guide bearing, the second encoder being positioned on a rotating part of the bearing. The assembly is simplified as a result.

According to one particularly advantageous embodiment, the motor assembly includes at least one reduction gear between the rotor and the drum. Indeed, in that case, the gear reduction factor is also a factor increasing the resolution of the first measuring assembly when it is used to measure the position of the drum.

As previously indicated, the invention is in particular applicable when damping flexible elements are provided to isolate the motor assembly in terms of vibration and/or acoustics. It is in particular possible to provide that the device includes at least one rotary vibration damper positioned between the rotor and the drum. If the device includes a reduction gear interposed between the motor and the drum, it will be advantageous to position at least one damping flexible element between the reduction gear and the drum, to damp the vibrations created by the reduction gear. It is also possible to provide, if applicable in combination with the rotary damper, at least one stationary vibration damper positioned between the stator and the stationary support.

According to one preferred embodiment, the motor assembly includes a casing housed in a tube mounted stationary on the stationary support. The casing and/or the tube may have sound insulation functions. The tubes may include a guide bearing for the output shaft of the motor.

According to one preferred embodiment, the second measuring assembly comprises a bipolar sensor and the second encoder determines a change in polarity.

According to one embodiment, the comparator includes means for generating an offset value depending on at least the first algebraic comparison. Preferably, the device further includes a controller for controlling the motor in a subsequent phase based on at least a current value of the first signal indicative of the position of the screen measured in the subsequent phase and the shift value. The controller uses the shift information to correct its estimate of the position of the drum. Thus, if, during a control phase after the observation phase, the controller receives a positioning instruction to place the drum in a given position, in the form of an instruction to position the rotor of the motor in a supposedly corresponding position, it corrects the positioning instruction of the output shaft using the shift value determined during the observation phase.

In practice, the calibration memory stores as many calibration values as there are passages of the drum by the indexed position between the first end-of-travel position and the second end-of-travel position, for example high and low, of the screen. Preferably, the comparator generates the shift value as a function of several algebraic comparisons between several current values of the first signal indicative of the position of the screen measured upon passage by the indexed position in an observation phase and several calibration values stored in the calibration memory. It is in particular possible to determine the shift value by taking an algebraic average of the algebraic differences observed between current values and calibration values.

According to another aspect, the invention relates to a method for controlling a device for winding the screen, including a winding drum of the screen, driven by a rotor of a motor, the method being characterized by the following steps:

in a calibration phase, at least one calibration value of a rotation angle corresponding to an indexed position of the drum is stored;

in an observation phase, the drum is rotated using the motor while measuring a current value of the rotation angle of the rotor of the motor and detecting the passage of the drum by the indexed position, and at least one quantitative comparison is done between the current value when the drum passes by the indexed position and the calibration value.

According to one particularly advantageous embodiment, in the calibration phase, the drum is driven with the motor between a first end-of-travel position and a second end-of-travel position in a reference rotation direction and as many calibrations are stored as there are passages of the drum by the indexed position. One thus obtains a large observation range. Advantageously, in the observation phase, the drum is rotated in the reference direction, and as many quantitative comparisons are done between the current value when the drum passes by the indexed position and the calibration value as there are passages of the drum by the indexed position. The observation phase may be carried out over all or part of the travel between the first end-of-travel position and the second end-of-travel position.

It is possible to take advantage of the comparisons done to determine a shift value over one revolution or more than one revolution of the drum, based on several of said comparisons. One thus has several pairs of values to compare, at least one per revolution, to form the shift value. It is thus for example possible to obtain the average of the shifts observed for each revolution.

According to one embodiment, a new position value of the motor is determined upon each passage by an indexed position as a function of the current value of the first signal indicative of the measured position of screen and the shift value determined in the observation phase for one or more indexed positions.

It is also provided to be able to combine the features of the different embodiments with one another to form other variants.

BRIEF DESCRIPTION OF THE FIGURES

Other features and advantages of the invention will emerge from reading the following description, in reference to the appended figures, which illustrate:

FIG. 2, a control circuit of the device of FIG. 1;

FIG. 3, a diagram illustrating the processing done of the signal.

For greater clarity, identical elements are referenced by identical reference signs in all of the figures.

DETAILED DESCRIPTION OF EMBODIMENTS

Figure 1:
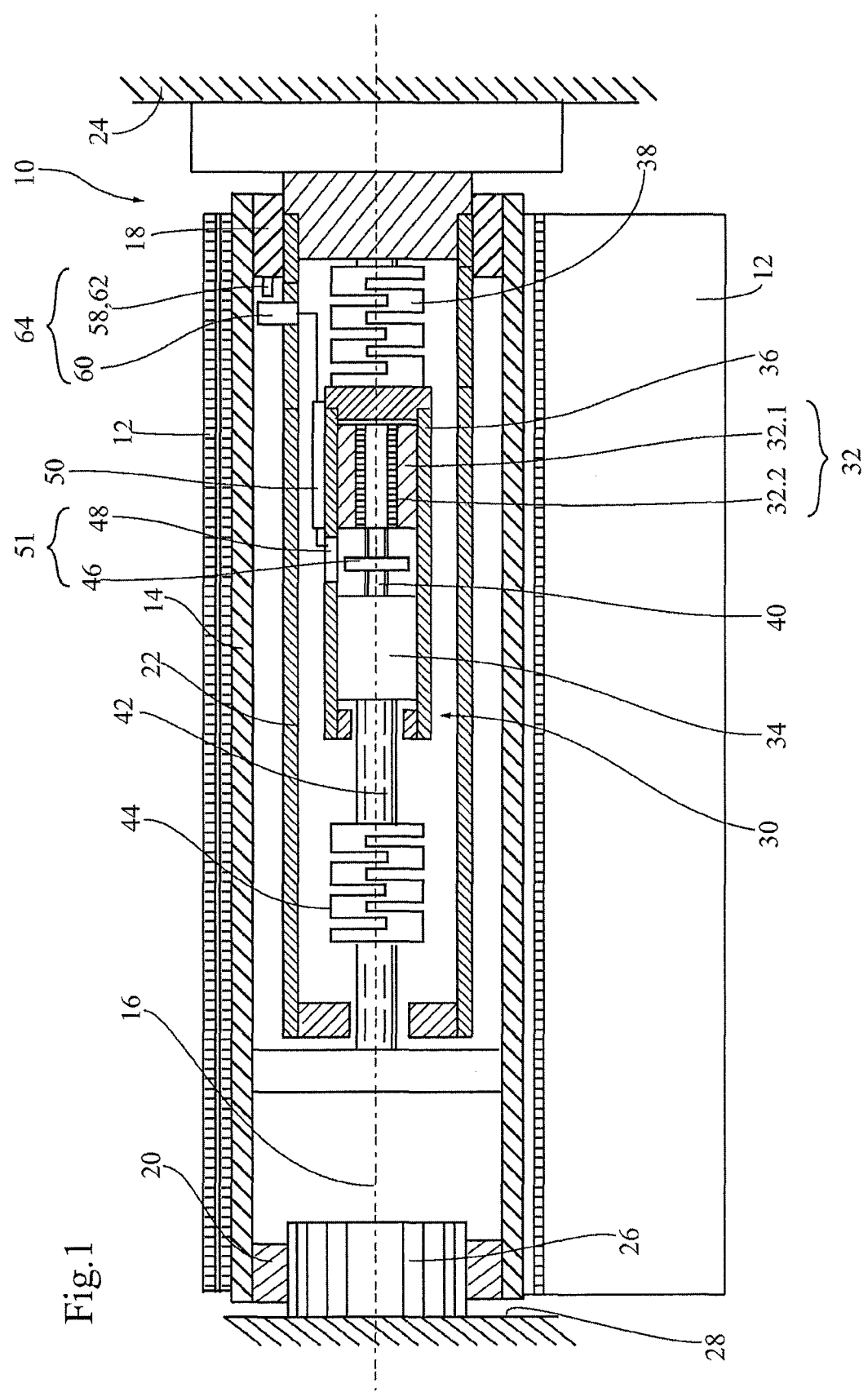
FIG. 1, a device for winding a screen according to one embodiment of the invention.

FIG. 1 shows a motorized device 10 for winding a screen, for example a roller blind 12. This device is made up of a winding drum 14 guided in rotation around a stationary geometric axis 16 via one or more bearings 18, 20, which may be smooth or rolling, and which are inserted between the drum 14 and a fastening assembly, which, in the example, is made up of a stationary tube 22 braced on a stationary support 23 secured to a first wall 24 and supporting the bearing 18, and an independent support 26 fastened to a second wall 28 and supporting the bearing 20.

Inside the stationary tube 22, a motor assembly 30 is housed made up of a motor 32 and a reduction gear 34 with one or more speed reduction stages, positioned in a shared tubular casing 36. The casing 36, without contact with the stationary tube 22, is fastened to the stationary support 23 by means of a stationary damping flexible element 38, which may be made from rubber, plastic or elastomer, or other materials having a good elasticity and a high viscoelastic damping rate, in particular in torsion. Alternatively, the damping flexible element can be made using appropriate cutouts, as for example shown in FIG. 1. The motor assembly 32 includes a stator 32.1 and a rotor 32.2 secured to an output shaft 40 that attacks the reduction gear 34. The latter has an output member 42, for example a crown, a planet carrier or, as illustrated in the figure, a shaft, that is connected to the winding drum 14 via a rotating damping flexible element 44. According to alternatives that are not shown, it is possible to place a rotating flexible damper element in other locations in the kinematic transmission chain connecting the output shaft 40 to the drum 14, for example between the output shaft 40 and the reduction gear 34. The casing 36 is a massive and rigid tube, serving to maintain the motor 32 and the reduction gear 34. It may, however, be equipped with damping elements, for example surrounded by O-rings so that it may be suspended in the tube of the actuator.

The rotor 32.2 of the motor has an annular multipolar assembly having a high number of poles, for example at least 16, and preferably at least 32 poles evenly distributed on its circumference, forming a first encoder 46. Alternatively, the first encoder is made independently of the rotor at an output shaft of the motor rotating the rotor. A first sensor 48 can be positioned at air gap distance from the encoder 46, and connected to a control circuit support 50 of the motor 32, stationary relative to the casing 36 of the motor, so as to read the state changes during the rotary progression of the encoder 46 in front of the sensor 48. Advantageously, the first sensor 48 comprises two detectors (not shown), for example two Hall effect sensors or two reed switches, placed such that they each receive magnetic information alternating separately. Thus, the analysis of the signals provided by the two detectors forming the first sensor 48 makes it possible to identify the position variations as well as the rotation direction. The first sensor 48 and the first encoder 46 form, with the control circuit 50, a first measuring assembly 51 for measuring the rotation of the rotor 32.2. The control circuit 50, illustrated in FIG. 2, in particular includes a conditioning stage of the signal, for example to build, from the periodic analog signal delivered by the sensor 48, a binary signal having one or more pulses per period of the analog signal. The pulse counter 52 counts the resulting pulses continuously. The control circuit is also equipped with a detecting means 54 for detecting the rotation direction of the rotor 32.2 of the motor, which may or may not call on the first encoder 46 and the first sensor 48, in particular two detectors of the first sensor. The counter 52 is incremented upon each pulse detected in a predetermined rotation direction, and decremented upon each pulse in the opposite rotation direction. The control circuit 50 thus accesses information representing the number of revolutions and fractions of revolutions traveled by the rotor of the motor, for example relative to one of the end-of-travel positions serving as a reference position for which the counter is calibrated at 0. The control circuit 50 further has a memory 56 containing calibration values of the counter, as will be explained below.

Similarly, a second encoder 58 is integrated into the rotating part of the bearing 18 supporting the drum 14, across from a second sensor 60 fastened to the tubular support 22 and connected to the control circuit 50. The second encoder 58 may have only one singularity 62, so as to index an angular position of the drum 14. The second encoder 58 and the second sensor 60 form a second measuring assembly 64. The second sensor 60 may include only one detector, the rotation direction being irrelevant. The encoder 58 is for example a unipolar or bipolar sensor inserted into a dovetail space on the outer periphery of the bearing 18. The second sensor is installed on a printed circuit inside the stationary tubular support 22.

FIG. 3 shows, from left to right:
the actual position of the drum between a high end-of-travel position and a low end-of-travel position,
the corresponding pulses seen by the second sensor at a rate of one per revolution,
the value of the position of the rotor of the motor read at the output of the counter at the time of the pulses seen by the second sensor.

In the following table 1, the second row shows the values of the position of the rotor 32 of the motor read when the control circuit detects the passage of the drum 14 by the indexed position, recorded during a calibration phase of the device while driving the drum 14 from the low end-of-travel position to the high end-of-travel position, over five revolutions. This calibration phase is signaled by a message specific to the actuator. It takes place in principle upon the first installation, or in case of readjustment of the ends-of-travel. In case of readjustment of an actuator having already undergone a creep-type deformation, this calibration phase takes the existing deformations into account and the implemented method makes it possible to account for the additional deformations that may subsequently occur in the lifetime of the product. In all cases, this calibration phase makes it possible to take the effects of the load into account depending on the position, and the observations on the following phases will make it possible to deduce only the variations relative to a reference situation, only related to the deformations in the actuator.

Thus, a charged actuator may be deformed by a maximum angle of 30° (permanent load deformation for a torque exceeding 6 Nm), while a precision of +/−2° or 3° is required in the application field.

TABLE 1

|  | Revolution | | | | | |
| --- | --- | --- | --- | --- | --- | --- |
|  | 0 | 1 | 2 | 3 | 4 | Shift |
| Reference value | 0 | 1686 | 3360 | 5058 | 6740 | — |
| Observation phase no. 1 | 2 | 1690 | 3365 | 5060 | 6742 | +3 |
| Observation phase no. N | −2 | 1687 | 3363 | 5062 | 6739 | +1 |

On a third row of this table 1, the values of the position of the rotor 32.2 of the motor are shown that are read during a first observation phase while the drum 14 rotates in the upward direction over more than one revolution, and preferably over the entire travel between the lower end-of-travel position and the upper end-of-travel position. In the last column, for this third row, the average is provided of the differences observed between the readings during the observation phase and the values read during the calibration phase.

On a fourth row, the same procedure has been followed, for another observation phase, under the same raising conditions. The calibration phases will preferably be done in the raising direction, the screen being loaded relative to the motor and the rotation of the bearing therefore being more regular. Upon lowering, it is sometimes possible to observe jumping phenomenon, which may distort the measurements. However, the method is meant to apply to both movement directions.

During each observation phase, the control circuit determines the deviation relative to the content of the calibration memory for one or more corresponding pulses experienced by the second sensor, and a correction is derived therefrom to be made on each of the pulses. The position counter will thus be adjusted relative to the observed shift. Alternatively, an average of the shifts over an observation phase may be built and the adjustment of the counter done at the end of the observation phase. The shift observed for each pulse yields a measurement of the creep or deviation of the geared motor.

Naturally, various changes can be considered.

In particular, various algorithms can be considered to use the indexed position datum. In particular, the recalibration upon each pulse must be done in a reasonable value range. Thus, to prevent outside interventions, for example obstacles, from being considered as deformations of the actuator, certain inconsistent shift values will be excluded.

The number, position and composition of the damping flexible elements can be chosen freely based on the considered application.

The measuring assemblies for the precise detection of the rotation of the rotor, for detecting the rotation direction and for detecting the indexed position of the drum 14 can be of any type. In particular, using a bipolar magnet at the bearing allows a cleaner passage detection (it is then possible to detect a transition between two states), but the hysteresis effects will make it necessary to verify the rotation direction before interpreting any signal from the second sensor. In the case of a unipolar encoder, the detection will be done upon activating a threshold. Here again, it will be possible to store different values for a same passage, but in two different directions.

The control circuit 50 can be fastened indifferently to the casing 36, the stationary tube 22, or the stationary support 23.

The geared motor assembly 30 is not necessarily housed in the tube 22. The second stationary support 26 can be omitted.

The end-of-travel positions may or may not correspond to physical limitations of the travel of the screen. They may in particular involve reference positions or predetermined preferred positions.

It may be considered to replace the calibration values with values observed during the previous observation phase(s), for example by using sliding averages, so as to give the device a permanent learning capacity.

The method will in particular be applicable for installations where the screen is movable over two or three revolutions or for actuators that must provide a torque greater than or equal to 6 Nm. Below this, the torque to be applied is low and the creep deformation is negligible.

It will also be possible to take advantage of the comparison between the signals delivered by the first sensor upon passage of the singularity detected by the second sensor to detect the presence of an obstacle, or to propose an estimate of the load torque on the drum.

The invention claimed is:

1. A winding device for a screen, including
   a winding drum for winding the screen, which can rotate around an axis of rotation with respect to a stationary frame of reference over more than one revolution between at least one first end-of-travel position and a second end-of-travel position;
   a motor assembly comprising a motor equipped with a stator intended to be fixed to a stationary support and a rotor kinematically connected to the winding drum;
   a first measurement assembly comprising a first encoder secured to the rotor, a first sensor for reading the first encoder and generating a first counting signal when the first encoder turns; and first processing means generating, as a function of the first counting signal, a first signal indicative of the position of the screen, the first signal being monotonic when the drum moves from the first end-of-travel position to the second end-of-travel position;
   a second measurement assembly for detecting at least one indexed position of the drum per revolution of the drum in the fixed frame of reference,
   a calibration memory for storing at least one first calibration value for the first signal indicative of the position of the screen in the indexed position of the drum; and
   a comparator for delivering at least one first quantitative algebraic comparison between a current value of the first signal indicative of the position of the screen as measured on passing through the indexed position during an observation phase and the first calibration value.

2. The device according to claim 1, wherein the second measuring assembly includes a second encoder secured to the drum, a second stationary sensor in the stationary frame of reference to read the second encoder, and second processing means to generate a second signal representative of a passage by the indexed position when the second encoder rotates with the drum.

3. The device according to claim 2, wherein the second encoder has no more than eight singularities, and preferably one singularity, readable by the second sensor upon each drum revolution.

4. The device according to claim 2, wherein the drum is guided relative to the stationary support by means of at least one guide bearing, the second encoder being positioned on a rotating part of the bearing.

5. The device according to claim 1, wherein the motor assembly includes at least one reduction gear between the rotor and the drum.

6. The device according to claim 1, wherein the device includes at least one rotary vibration damper positioned between the rotor and the drum.

7. The device according to claim 1, wherein the device includes at least one stationary vibration damper positioned between the stator and the stationary support.

8. The device according to claim 1, wherein the motor assembly includes a casing housed in a tube mounted stationary on the stationary support.

9. The device according to claim 1, wherein the second measuring assembly comprises a bipolar sensor and the second encoder determines a change in polarity.

10. The device according to claim 1, wherein the comparator includes means for generating an offset value depending on at least the first algebraic comparison.

11. The device according to claim 10, wherein it further includes a controller for controlling the motor in a subsequent phase based on at least a current value of the first signal indicative of the position of the screen measured in the subsequent phase and the shift value.

12. The device according to claim 10, wherein the comparator generates the shift value as a function of several algebraic comparisons between several current values of the first signal indicative of the position of the screen measured upon passage by the indexed position in an observation phase and several calibration values stored in the calibration memory.

13. A method for controlling a device for winding a screen, including a winding drum of the screen, driven by a rotor of a motor, the method comprising:
in a calibration phase, at least one calibration value of a rotation angle corresponding to an indexed position of the drum is stored;
in an observation phase, the drum is rotated using the motor while measuring a current value of the rotation angle of the rotor of the motor and detecting the passage of the drum by the indexed position, and at least one quantitative comparison is done between the current value when the drum passes by the indexed position and the calibration value.

14. The method according to claim 13, wherein in the calibration phase, the drum is driven with the motor between a first end-of-travel position and a second end-of-travel position in a reference rotation direction and as many calibrations are stored as there are passages of the drum by the indexed position.

15. The method according to claim 14, wherein in the observation phase, the drum is rotated in the reference direction, and as many quantitative comparisons are done between the current value when the drum passes by the indexed position and the calibration value as there are passages of the drum by the indexed position.

16. The method according to claim 15, wherein a shift value is determined over one revolution or more than one revolution of the drum, based on several of said comparisons.

17. The method according to claim 13, wherein a new position value of the motor is determined upon each passage by an indexed position as a function of the current value of the first signal indicative of the measured position of screen and the shift value determined in the observation phase for one or more indexed positions.

* * * * *